United States Patent
Masaki et al.

[11] Patent Number: 5,957,113
[45] Date of Patent: Sep. 28, 1999

[54] FUEL VAPOR RECOVERY APPARATUS

[75] Inventors: Toshiteru Masaki, Yokosuka; Hideyuki Nagashima, Ninomiya-machi, both of Japan

[73] Assignee: NOK Corporation, Tokyo, Japan

[21] Appl. No.: 09/050,982

[22] Filed: Mar. 31, 1998

[30] Foreign Application Priority Data

Mar. 31, 1997 [JP] Japan .................................. 9-094349
Sep. 18, 1997 [JP] Japan .................................. 9-272063

[51] Int. Cl.⁶ .................................................. F02M 37/04
[52] U.S. Cl. ........................ 123/518; 123/519; 123/541
[58] Field of Search .................................. 123/516, 518, 123/519, 520, 541

[56] References Cited

U.S. PATENT DOCUMENTS

| | | | |
|---|---|---|---|
| 4,304,206 | 12/1981 | Hall | 123/518 |
| 4,671,071 | 6/1987 | Sasaki | 62/54 |
| 4,732,588 | 3/1988 | Covert et al. | 123/519 |
| 4,829,968 | 5/1989 | Onufer | 123/518 |
| 5,255,735 | 10/1993 | Raghava et al. | 165/111 |
| 5,275,145 | 1/1994 | Tuckey | 123/521 |
| 5,318,069 | 6/1994 | Harris | 137/588 |
| 5,415,196 | 5/1995 | Bryant et al. | 137/14 |
| 5,666,925 | 9/1997 | Denz et al. | 123/520 |
| 5,861,050 | 1/1999 | Pittel et al. | 95/115 |

FOREIGN PATENT DOCUMENTS

| | | |
|---|---|---|
| 58-46860 | 3/1983 | Japan . |
| 61-39629 | 3/1986 | Japan . |
| 63-12652 | 1/1988 | Japan . |

*Primary Examiner*—Thomas N. Moulis
*Attorney, Agent, or Firm*—Jacobson, Price, Holman & Stern, PLLC

[57] ABSTRACT

The present invention is provides a fuel vapor recovery apparatus for automobiles that includes a canister for cooling and condensing the fuel vapor generated in the fuel tank and a membrane separation means for separating the fuel vapor flowed from the canister. The present invention also provides for a membrane separation means for separating the fuel vapor from a canister storing fuel vapor into a fuel rich mixture and a means for liquefying and condensing this separated fuel rich mixture.

14 Claims, 10 Drawing Sheets

FUEL VAPOR RECOVERY APPARATUS

BACKGROUND OF THE INVENTION

The present invention relates to a fuel vapor recovery apparatus which recovers and liquefies fuel vapor generated from a fuel tank of a vehicle or the like and returns the liquefied fuel vapor to the fuel tank.

DESCRIPTION OF THE PRIOR ART

Conventionally, a fuel vapor recovery apparatus 100 as shown in FIG. 10 has been adapted for the purpose of preventing evaporation into the atmosphere of fuel vapor generated from fuel tanks of vehicles or the like. This fuel vapor recovery apparatus allows, for example, fuel vapor G (vapor) generated from an increase in temperature of fuel L in a fuel tank to be absorbed and stored in an activated charcoal 103a of a canister 103. The vapor is collected through a ventilation passage 102 and introduced to an intake pipe Ea by ventilation passages 105a and 105b through a control valve 104 by utilizing suction negative pressure of the intake pipe Ea of an engine E so that the stored amount may not exceed an absorbing capacity of the activated charcoal 103a of the canister 103.

To describe with more detail, the fuel vapor G which is absorbed and stored in activated charcoal 103a in the canister 103 is scavenged (purged) together with air (gas) that is introduced into the canister 103 from an atmosphere open hole connected with the base of the canister 103 (but not shown in the drawing) and burned in a combustion chamber Eb of the engine E by controlling an introducing amount to the intake pipe Ea by a control valve 104.

In such a fuel vapor recovery apparatus 100 as described above, the air-fuel mixture delivered to the intake pipe Ea from the ventilation passages 105a and 105b is controlled by control valve 104. However, since the air-fuel mixture is a mixture of air and the fuel vapor G (fuel ingredient), both of which are not accurately measured, when the air-fuel mixture is added to the fuel ingredient from a fuel injection valve which is accurately measured upstream of the intake pipe Ea, combustion on the basis of a specified mixture ratio becomes difficult which causes problems such as deterioration of the driving characteristics of the engine E and an undesirable effect to exhaust gases or the like.

Therefore, at a time when there is demand for a reduction in fuel consumption to cope with recent environmental issues and resources saving, if a super lean mixture ratio burn (mixture ratio about 20) is performed for savings by shifting from a lean mixture ratio burn (mixture ratio about 40–50), there is concern that such problems as described above will occur substantially.

Moreover, in an apparatus that stops an engine when the vehicle stops at an intersection for the purpose of reducing fuel consumption or in the case of a hybrid apparatus that selectively utilizes either or both the engine (internal combustion engine) and an electric motor according to certain driving criteria of the vehicle, when the engine stops or the vehicle runs by the electric motor, it becomes impossible to scavenge (purge) the fuel vapor absorbed and stored in the canister while the fuel from the fuel tank continues evaporating. As a result there is a possibility that the fuel vapor generated will exceed the absorption-storage capability of the canister.

On the other hand, in the apparatus for absorbing and storing the fuel vapor by the conventional canister, it is premised that the apparatus is operated at a specified atmospheric temperature. However, under severe driving conditions like a traffic jam in the summer when atmospheric temperature is high, there is every possibility that the amount of fuel vaporized from the fuel tank will exceed the absorption-storage capability and the scavenging amount of the canister. In this case, diffusion into the atmosphere is unavoidable and it is a concern that the environment will be adversely affected.

Accordingly, in an apparatus for keeping the fuel vapor G from the fuel tank 101 absorbed by the canister 103 first, it is difficult to make the volume of the canister 103 small when the problems as described above are taken into consideration.

The present invention is designed to solve the problems of the above described prior art, and it is an object of the present invention to provide a fuel vapor recovery apparatus, wherein by recovering, liquefying, and then returning the fuel vapor generated from a fuel tank back to the fuel tank, the amount of the fuel vapor introduced to an intake portion of an engine is reduced or eliminated, thereby improving driving characteristics of the engine, and avoiding to diffuse the fuel vapor into the atmosphere even when the fuel vapor generated is plentiful at high temperatures or the like.

Also, the present invention is devised to solve the problems of the above described prior art, and it is another object of the present invention to provide a fuel vapor recovery apparatus, wherein the fuel vapor generated in the fuel tank is recovered, liquefied, and then returned to the fuel tank allowing the amount of the fuel vapor introduced to the intake portion of the engine to be reduced or eliminated, and thereby improving driving characteristics of the engine. As a result, fuel vapor is not diffused into the atmosphere even when the fuel vapor generated is plentiful, and thus it is possible to make canister as compact as possible.

SUMMARY OF THE INVENTION

The present invention provides a fuel vapor recovery apparatus including a canister which is provided with an inflow port for introducing fuel vapor from the fuel tank, an absorption means for absorbing the fuel vapor flowed therein, a gas or air introduction port for introducing gas, such air, for scavenging the fuel vapor absorbed by the absorption means, an exhaust port for exhausting the scavenged vapor, a membrane separation means for separating by a separation membrane the fuel vapor flowed from the exhaust port of said canister into a fuel mixture (or fuel rich component) and an air rich mixture (or air or gas rich component) and exhausting each of the mixtures from a fuel rich mixture exhaust port and a gas rich mixture exhaust port respectvely, a scavenging circulatory passage formed by connecting the gas rich mixture exhaust port of said film separation means and the gas introduction port of said canister, a condensation means for liquefying the fuel rich mixture introduced from the fuel rich mixture exhaust port of said membrane separation means and a return passage for returning the liquefied fuel in said condensation means to the fuel tank.

According to the embodiment described above, the fuel vapor from the fuel tank is introduced to the canister and then separated by the separation membrane of the separation means into the fuel rich mixture and the air rich mixture. The air rich mixture is again returned to the canister by the scavenging circulatory passage and scavenges the fuel vapor absorbed by the canister. The fuel rich mixture is liquefied by the condensation means and returned to the fuel tank through the return passage, and the fuel vapor generated is also liquefied and returned to the fuel tank. Therefore, the fuel vapor is not supplied to the engine to be burned at all. Further, diffusion into the atmosphere of the fuel vapor is also avoided.

In an altenative embodiment, a fuel vapor recovery apparatus cincludes a canister provided with an absorption means for temporarily storing fuel vapor from a fuel tank and a supply passage for supplying the fuel vapor scavenged from inside of the canister to an absorbing portion of an engine. This embodiment further comprises a membrane separation means which is connected near the midpoint of said supply passage and which separates by a separation membrane the fuel vapor into a fuel rich component exhausted from a fuel rich exhaust port and an air rich component exhausted downstream said supply passage, a condensation means for liquefying the fuel rich component introduced from the fuel rich component exhaust port of said membrane separation means and separated by the membrane, and a return passage for returning the liquefied fuel from said condensation means to the fuel tank.

According to this embodiment as described above, the fuel vapor scavenged from the canister is supplied to an intake portion of the engine through the supply passage. At that time, the fuel vapor is separated into a fuel rich component by the membrane separation means, and an air rich component that is supplied to the intake portion of the engine. The fuel rich component which is rich in fuel, is liquefied by the condensation means and returned to the fuel tank by the return passage.

In a further embodiment, the fuel vapor recovery apparatus includes a canister which is provided with an inflow port for introducing fuel vapor from a fuel tank, an absorption means for absorbing the fuel vapor flowed therein, a gas introduction port for scavenging the fuel vapor absorbed by the absorption means, an exhaust port for exhausting the scavenged fuel vapor, a supply passage for supplying the fuel vapor scavenged from the exhaust port of said canister. The supply passage for supplying the fuel vapor scavenged from the exhaust port of the canister to an intake portion of an engine further includes a membrane separation means which is connected at the midpoint of said supply passage and separates by a separation membrane the supplied fuel vapor into a fuel rich mixturret exhausted from a fuel ingredient exhaust port and an air ingredient exhausted from a gas irich exhaust port, a scavenging circulatory passage formed by connecting the gas rich port of said membrane separation means and the gas inflow port of said canister, a condensation means for liquefying the fuel ingredient introduced from the fuel rich exhaust port of said membrane separation means and separated by the membrane, and a return passage for returning the liquefied fuel by said condensation means to the fuel tank.

According to the embodiment as described above, it is quite possible to supply the fuel vapor scavenged from the canister through the supply passage to the intake portion of the engine or to introduce the fuel vapor to the membrane separation means. The fuel vapor introduced to the membrane separation means is separated by a separation membrane into a fuel rich mixture and an air rich mixture. The air rich mixture is again returned to the canister by the scavenging circulatory passage and scavenges the fuel vapor absorbed by the canister. The fuel rich mixture is liquefied by the condensation means and returned to the fuel tank by the return passage.

It is also desirable for the fuel vapor recovery apparatus to further includes a detection means for detecting the amount of fuel vapor absorbed in the canister, a fluid conveyance means on the downstream side of that membrane separation means, and a control means for controlling the operation of said fluid conveyance means and said condensation means according to detected conditions from said detection means.

According to the above, the fuel vapor recovery apparatus can be suitably operated according to the storage amount of the fuel vapor in the canister.

It is also advantageous if the fuel vapor recovery apparatus further includes a fuel vapor sensor at the gas introduction port and at the exhaust port of said canister. A fluid conveyance means is provided downstream of the passage of said membrane separation means, and a control means controls said fluid conveyance means and said condensation means according to detected conditions of said fuel vapor sensors.

According to the embodiment as described above, the fuel vapor begins to flow toward the gas introduction port when the storage capacity of the fuel vapor of the canister is nearly full. When the fuel vapor is detected by the fuel vapor sensor of the gas introduction port, the control means begins to operate the fluid conveyance means and the condensation means. Furthermore, when the fuel vapor concentration of the fuel vapor flowed from the exhaust port of the canister decreases, the fuel vapor sensor of the exhaust port stops detecting the fuel vapor, and the control means stops operation of the fluid conveyance means and the condensation means, thereby automatic control of the fuel vapor recovery apparatus can be achieved.

It is very effective if said condensation means includes a heat absorption member connected with a semiconductor device utilizing peltier effect and the heat absorption member and the fuel irich mixture are kept in contacted.

Based on the above discussion, the fuel rich mixture is liquefied by contacting the heat absorption member which is kept at a low temperature, and the condensation means can be constrated as compact as possible, thereby improving its ability to be installed in vehicles.

It is also advantageous if the fuel vapor recovery apparatus further includes a driving condition detection means for detecting the driving conditions of the engine wherein said control means controls operation of the fluid conveyance means and the condensation means according to the driving conditions of the engine detected by the driving condition detection means.

Accordingly, when the engine stops or stays in idling condition or runs at low speed, the amount of the fuel vapor supplied to the intake port of the engine is decreased by liquefying the fuel vapor from the canister and increasing the amount returned to the fuel tank, or conversely when the engine runs at high speed, the volume of the fuel vapor supplied to the intake portion of the engine is made to increase. Thus, the operational control of the fuel vapor recovery apparatus can be made in connection with the driving conditions of the engine.

To achieve another object as described above, the present invention includes a condenser which is provided with an inflow port for introducing fuel vapor from a fuel tank, a condensation means for condensing the fuel vapor flowed into the condenser, a return passage for returning the fuel liquefied by the condensation means to the fuel tank, and an exhaust port for exhausting the fuel vapor not liquefied by said condensation means. The invention further includes a canister which is provided with an inflow port for introducing the fuel vapor not liquefied by said condenser, an absorption means for absorbing the fuel vapor flowed into the canister, a gas introduction port for introducing gas scavenging the fuel vapor absorbed by the absorption means, an exhaust port for exhausting the scavenged fuel vapor, and a passage formed by connecting the exhaust port of said canister to the inflow port for introducing fuel vapor into the condenser or by a control valve to switch to a port for flowing the fuel vapor of said condenser to the engine.

According to the construction as described above, the fuel vapor from the fuel tank is condensed and liquefied first by the condenser and then returned to the fuel tank. The fuel vapor not condensed by the condenser apparatus is first introduced to the canister and then circulated to an inflow port for introducing the fuel vapor to the condenser at the time of scavenging. Thereby the fuel vapor is recovered and the amount of fuel vapor flowing to the canister is reduced. As a result, the canister can be made as compact as possible, and there is no need for the fuel vapor to be directed to the engine for combustion. Also, diffusion of the fuel vapor into the atmosphere can be prevented.

Also, the present invention can includes a membrane separation means which separates by a separation membrane the fuel vapor flowed from the exhaust port of said canister into the air rich mixture and the fuel rich mixture and exhausts each of the ingredients from the air rich mixture exhaust port and the fuel rich mixture exhaust port, a scavenging circulatory passage formed by connecting the air rich mixture exhaust port of said membrane separation means and gas introduction of the canister port, and a fuel vapor return passage for connecting the fuel rich mixture exhaust port of said membrane separation means and the inflow port for introducing the fuel vapor of said condenser.

According to the construction as described above, the fuel vapor from the fuel tank is condensed first by the condenser and returned to the fuel tank. The fuel vapor not condensed is introduced first to the canister and then separated by a separation membrane of the membrane separation means into the fuel rich mixture and the air rich mixture. The air rich mixture in the membrane separation means is again returned to the canister through the scavenging circulatory passage and the fuel rich mixture is again returned to the condenser through the fuel vapor return passage, and thus the recovery of the fuel vapor is performed.

Also, the condensation apparatus can include a container for storing the fuel introduced from the fuel tank and a cooling means for cooling and keeping cool the fuel inside the container. The condenser apparatus gets the fuel vapor flowed from said inflow port liquefied into the cooled fuel and absorbed in the container.

As a result of the above, condensing efficiency of the fuel vapor is improved.

Furthermore, the present invention includes a fuel vapor sensor with which the exhaust port of the canister is provided, a control valve for controlling a gas inflow amount to the gas introduction port of the canister, a temperature sensor for detecting the temperature of the fuel in the container of the condenser, and a control means for controlling the control valve and the condensation means according to detected conditions of said fuel vapor sensor and temperature sensor.

According to the above, the introducing amount of gas for scavenging the canister on the basis of concentration of the fuel vapor at the exhaust port of the canister is controlled. Also, by performing the control for getting the condensation means operated on the basis of detected information by the temperature sensor of the fuel temperature in the container, the driving of the fuel vapor recovery apparatus can be automatically controlled.

In addition, the present invention can includes a fuel vapor sensor with which each of the gas introduction port and the exhaust port of the canister is provided, a temperature sensor for detecting the temperature of the fuel in the container of the canister, a fluid conveyance means with which the fuel vapor return passage is provided, and a control means for controlling operation of said fluid conveyance means and said condensation means according to detected conditions of said fuel vapor sensor and said temperature sensor.

According to the construction described above, the fuel vapor begins to flow toward an air introduction port when a storing amount of the fuel vapor in the canister is nearly full, and in the case when the fuel vapor is detected by the fuel vapor sensor of the air introduction port, the control means starts driving of the fluid conveyance means. Also, in the case where the fuel concentration of the fuel vapor flowed from the exhaust port of the canister falls, the fuel vapor sensor of the exhaust port stops detecting the required concentration and the control means stops operation of the fluid conveyance means on the basis of the detected information. Also, by performing the control for making the condensation means operate on the basis of detected information by the temperature sensor of the fuel vapor temperature in the container, the operation of the fuel vapor recovery apparatus can be automatically controlled.

Moreover, the present invention includes an oil (or fuel or gasoline) filler cap sensor for detecting opening or shutting of an fuel filler cap in an fuel filler port of the fuel tank, wherein said control means controls operation of the cooling means according to detected conditions of the fuel filler cap sensor.

As a result, generation of the fuel vapor of fuel supply can be restrained.

Furthermore, said fuel return passage for returning the fuel liquefied by the condensation means to the fuel tank is connected close to the fuel supply portion for supplying the fuel to an engine. As a result, the fuel liquefied by the condensation means can be consumed by the engine soonest and generation of the fuel vapor thereafter can be reduced.

On the other hand, the present invention includes a condenser which is provided with an inflow port for introducing the fuel vapor from the fuel tank, a condensation means for condensing the fuel vapor flowed in, a fuel return passage for returning the fuel liquefied by the condensation means to the fuel tank, an exhaust port for exhausting the fuel vapor not liquefied by said condensation means, a canister provided with the absorption means for temporarily storing the fuel vapor not liquefied by said condenser, and a passage for supplying the fuel vapor scavenged from the inside of the canister to the intake portion of the engine.

Thus, in the case where the amount of the fuel vapor flowed into the canister is small, there is no need for the membrane separation means to be provided with and it is possible to supply the fuel vapor scavenged from the inside of the canister directly to the intake portion of the engine.

For reference, said condenser includes a container for storing the fuel introduced from the fuel tank and a cooling means for cooling and keeping cool the fuel in the container. It is also quite advantageous for the fuel vapor flowed from said inflow port to be liquefied and absorbed by the fuel cooled in the container. This will improve the condensing efficiency of the canister.

DETAILED DESCRIPTION OF THE PREFERRED EMBODIMENTS

Embodiment 1

Hereinafter, the present invention will be described with reference to the embodiments as shown in accompanying drawings.

Figure 1:
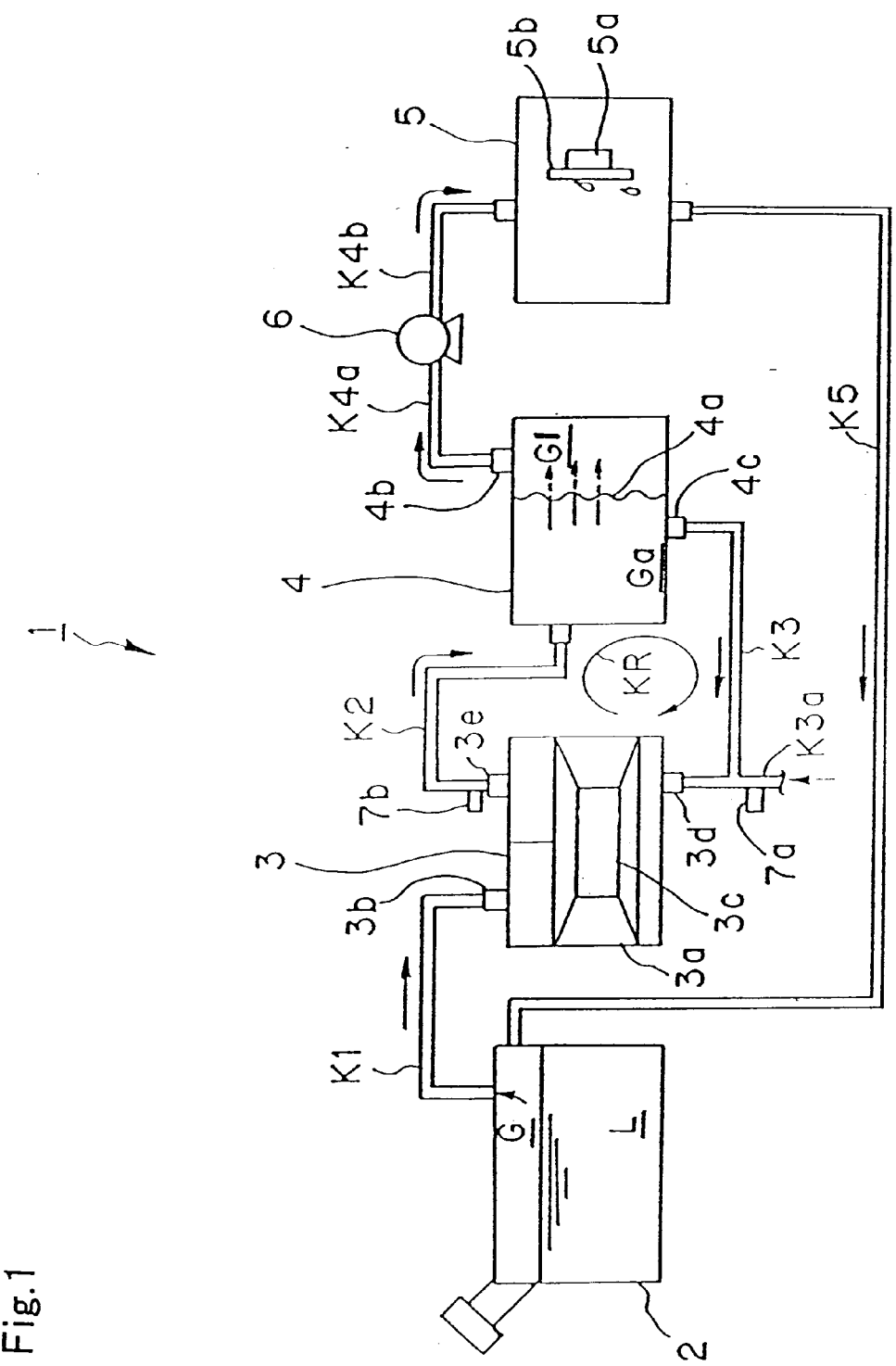
FIG. 1 is a descriptive diagram of the fuel vapor recovery apparatus according to a first embodiment.

The fuel vapor recovery apparatus 1 according to the first embodiment of the present invention, as shown in FIG. 1, is an apparatus which makes it possible for the fuel vapor G generated from a fuel tank 2 that is provided with automobiles, with, for example, gasoline or light oil made as fuel L, to be liquefied and returned again to the fuel tank and, as shown in FIG. 1, its main parts include a canister 3, a membrane separation means 4 and a condensation means 5.

First, the parts and the connections among the parts will be described as follows. The canister 3 includes an inflow port 3b connected with a passage K1 that introduces fuel vapor G from a fuel tank 2, an activated charcoal 3c as an absorption means for absorbing the fuel vapor flowed in, a gas introduction port 3d for introducing gas (air, most easy to handle, is used for the description, but it is also possible to use inert gas) for scavenging the fuel vapor G absorbed by activated charcoal 3c, and an exhaust port 3e for exhausting the fuel vapor G scavenged in the container 3a A membrane separation means 4 separates, by a separation membrane, the fuel vapor G flowed from the exhaust port 3e of the canister through passage K2 into a fuel rich mixture G1 (high concentration fuel vapor) and an air rich mixture Ga (the air scarcely containing the fuel rich mixture) and it is made possible to exhaust each of the mixture from a fuel rich mixture exhaust port 4b and a gas or air rich mixture exhaust port 4c A gas rich mixture exhaust port 4c of membrane separation means 4 and the gas introduction port 3d of the canister 3 is connected through passage K3 and air rich mixture Ga is made to return to the canister 3. Accordingly, scavenging circulatory passage KR is formed, which starts from the canister 3 and enters the membrane separation means 4 through passage K2 and then starts from the gas rich mixture exhaust port 4c of membrane separation means 4 and returns to the canister 3 through passage K3.

A condensation means 5 includes passage K4a from the fuel rich exhaust port 4b of the membrane separation means 4, a pump 6 as a fluid conveyance means, a semiconductor device 5a utilizing peltier effect in its inside for liquefying fuel ingredient G1 that is introduced via passage K4b and separated by the membrane, and a heat absorption fin 5b as a heat absorption member connected with the semiconductor device 5a. The fuel vapor G1 contacted with the heat absorption fin 5b is cooled, condensed, and liquefied, thereby being made into liquid fuel L (gasoline or light oil).

The fuel L liquefied by the condensation means 5 is returned to the fuel tank 2 through passage K5 as a returning passage.

Also an HC sensor 7a and 7b for detecting HC (hydrocarbon) contained in the fuel vapor G and working as a fuel vapor sensor is disposed close to the gas introduction port 3d and the exhaust port 3e, respectively, of the canister 3

The operation of the fuel vapor recovery apparatus 1 of the first embodiment will be described in details as follows. First, as a result of phenomena, such as an increase in temperature, etc. of fuel L in fuel tank 2, the fuel vapor G generated in the fuel tank 2 enters the canister 3 through passage K1 and is absorbed by the activated charcoal 3c.

If the generation of fuel vapor G further continues and exceeds an absorbing amount limit of the activated charcoal 3c, the fuel vapor G introduced to the canister 3 overflows from the activated charcoal 3c and advances toward the gas introduction port 3d disposed at the lower portion of the container 3a of the canister 3.

When the fuel vapor G is detected by an HC sensor 7a, a pump 6 and the semiconductor device 5a are activated by the control means (not shown in the drawing).

When the pump 6 is activated, a specified amount of the air is drawn in from the gas introduction port 3d via passage K3a by negative pressure generated at the fuel vapor G1 side of the separation membrane 4a of the membrane separation means 4 and flows toward the membrane separation means 4 through passage K2 by scavenging the fuel vapor G absorbed by the activated charcoal 3c inside of the canister 3

The air is further separated by a separation membrane into the fuel rich mixture G1 that permeates the separation membrane 4 and the air or gas rich mixture Ga that does not permeate the separation membrane 4

Air rich mixture Ga is returned to the canister 3 through passage K3 from the gas rich exhaust port 4c and is used again for scavenging fuel vapor G absorbed by the activated charcoal 3c inside of the canister 3. Accordingly, the fuel vapor G scavenged by the canister 3 circulates scavenging circulatory passage KR and fuel ingredient G1 is separated by the membrane separation means 4.

On the other hand, fuel ingredient G1 permeating and separated by the membrane 4a enters to the condensation means 5 through K4b and, by contacting the heat absorption fin 5b in the gaseous state, is cooled, condensed and liquefied, thereby becoming liquid fuel L (gasoline and light oil). And fuel L is returned to the fuel tank 2 through passage K5.

When this cycle is repeated until the fuel vapor G absorbed in the activated charcoal 3c in the canister 3 is scavenged and the fuel vapor G absorbed in the activated charcoal 3c is recovered, the concentration of fuel vapor G in passage K2 is reduced. When the HC sensor 7b detects a reduction in the concentration of the fuel vapor G, the control means determines that the amount of the fuel vapor G absorbed in the activated charcoal 3c is also reduced and stops the operation of the pump 6 and the semiconductor device 5a.

In this manner, since the fuel vapor recovery apparatus is automatically suitably activated according to generating condition of the fuel vapor G from the fuel tank 2, the fuel vapor G is liquefied and returned to the fuel tank 2. Accordingly, the fuel vapor recovered is not burned directly by the engine nor does it affect driving the characteristics of the engine, while at the same time preventing diffusion of the fuel vapor into the atmosphere.

For reference, when it is necessary that the flowing direction of the fluid, such as the fuel vapor G, etc. is in a fixed direction, it is possible that a check valve, or the like, can be disposed midway in the passages.

Figure 2:
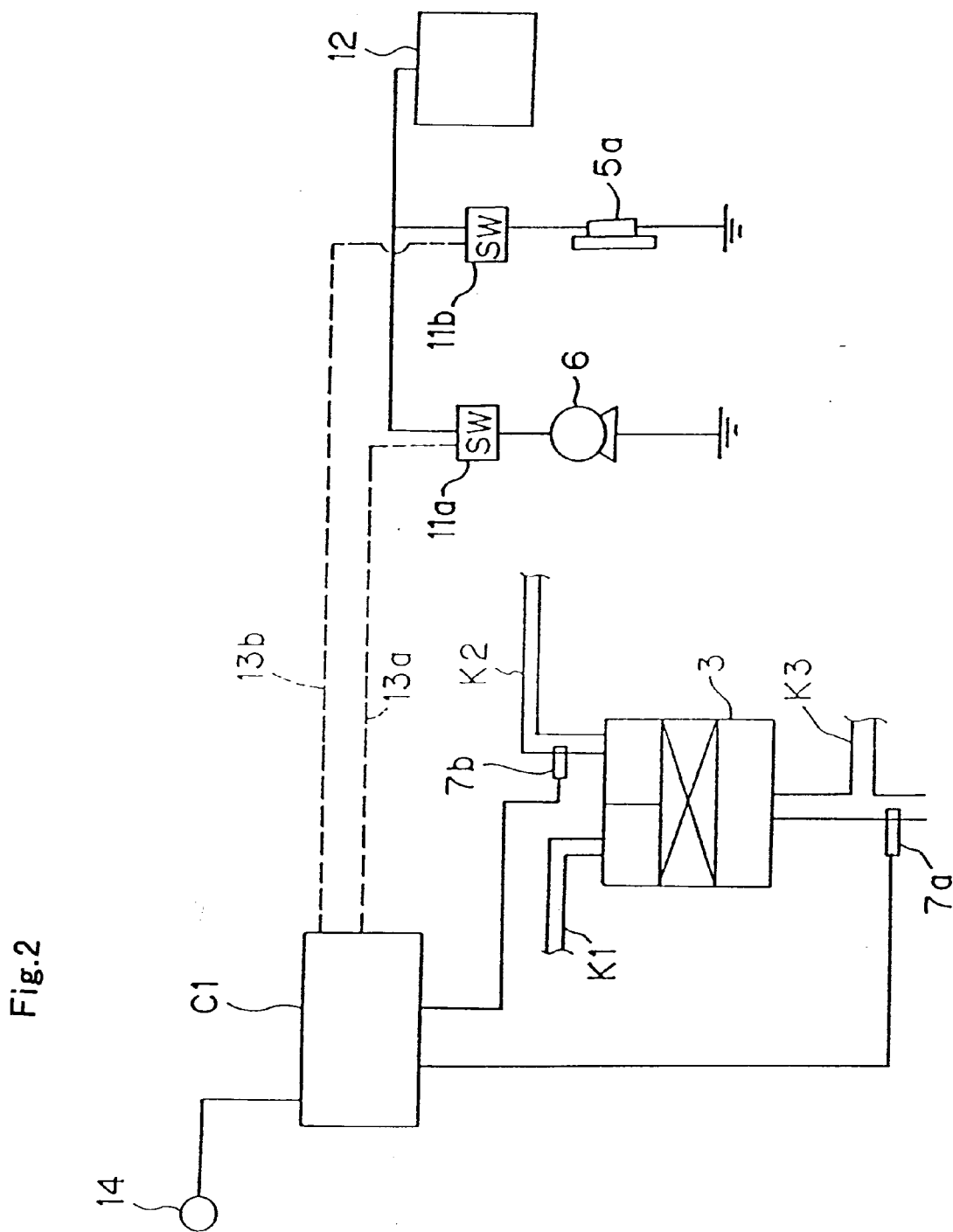
FIG. 2 is a circuit descriptive diagram of the control means of the fuel vapor recovery apparatus according to a first embodiment.

FIG. 2 is a circuit diagram, showing a typical example of the elements of the fuel vapor recovery apparatus 1 and a connection control means C1. In FIG. 2, the same reference is given to the same parts as described in FIG. 1. 11a and 11b are switches for supplying electric current from a battery 12 to the pump 6 and the semiconductor device 5a respectively, and are controlled for on-off by signal passage 13a and 13b from the control means C1. 14 is an alarm lamp which turns on when something abnormal happens to the fuel vapor recovery apparatus 1.

Additionally, there is no problem if the control means C1 adapts either a construction made from an electric circuit or a constructon including CPU and memory, wherein the information input is processed through software. It is also possible to adapt a constitution wherein the control means is built integrally in an engine control device attached to the engine body.

The HC sensor 7a detects concentration of fuel vapor G overflowed in the canister 3 and sends the detected signal to the control means C1. The control means C1 determines if the fuel vapor recovery apparatus 1 is to be activated according to the detected signal input and, when the apparatus is activated, switches 11a and 11b are turned on by signal passages 13a and 13b, respectively, and the pump 6 and the semiconductor device 5a are thereby driven.

The fuel vapor G absorbed in the activated charcoal 3c of the canister 3 is scavenged by operation of the fuel vapor recovery apparatus 1, and liquidization of the fuel vapor G and recovery thereof into the fuel tank 2 is performed.

When the concentration reduction of the fuel vapor G of the passage K2 is detected by the HC sensor 7b, the control means C1 determine this as a state for stopping the operation of the apparatus and turns off the switch 11a and 11b by the signal passage 13a and 13b and stops driving of the pump 6 and the semiconductor device 5a, respectively.

Also, a measurement means for measuring the time from the start of operation of the fuel vapor recovery apparatus 1 till the end of the operation is disposed in the control means C1. If operation of the fuel vapor recovery apparatus 1 does not end even when a specified time fixed from the start of the operation has elapsed, it will be determined that something abnormal happened to the apparatus and it is possible that an optional lamp 14 installed in a the driver's compartment is turned on.

Further, instead of an HC sensor as a detection means for detecting a fuel vapor absorption quantity in the canister 3, it is possible for the apparatus to include a loading weight sensor for detecting the weight of fuel vapor G stored in the activated charcoal 3c or a resistance sensor for measuring change in electric conductivity of the activated charcoal 3c and thereby detect the quantity of the fuel vapor G being stored. By these sensors, it is possible to control the operation of the fuel vapor recovery apparatus 1.

In such a case, for example, it is also possible to activate the apparatus when the maximum storing amount of fuel vapor G by the activated charcoal 3c reaches to about 70% and stop the operation of the apparatus when the maximum volume of fuel vapor G is reduced to about 20%.

Embodiment 2

Figure 3:
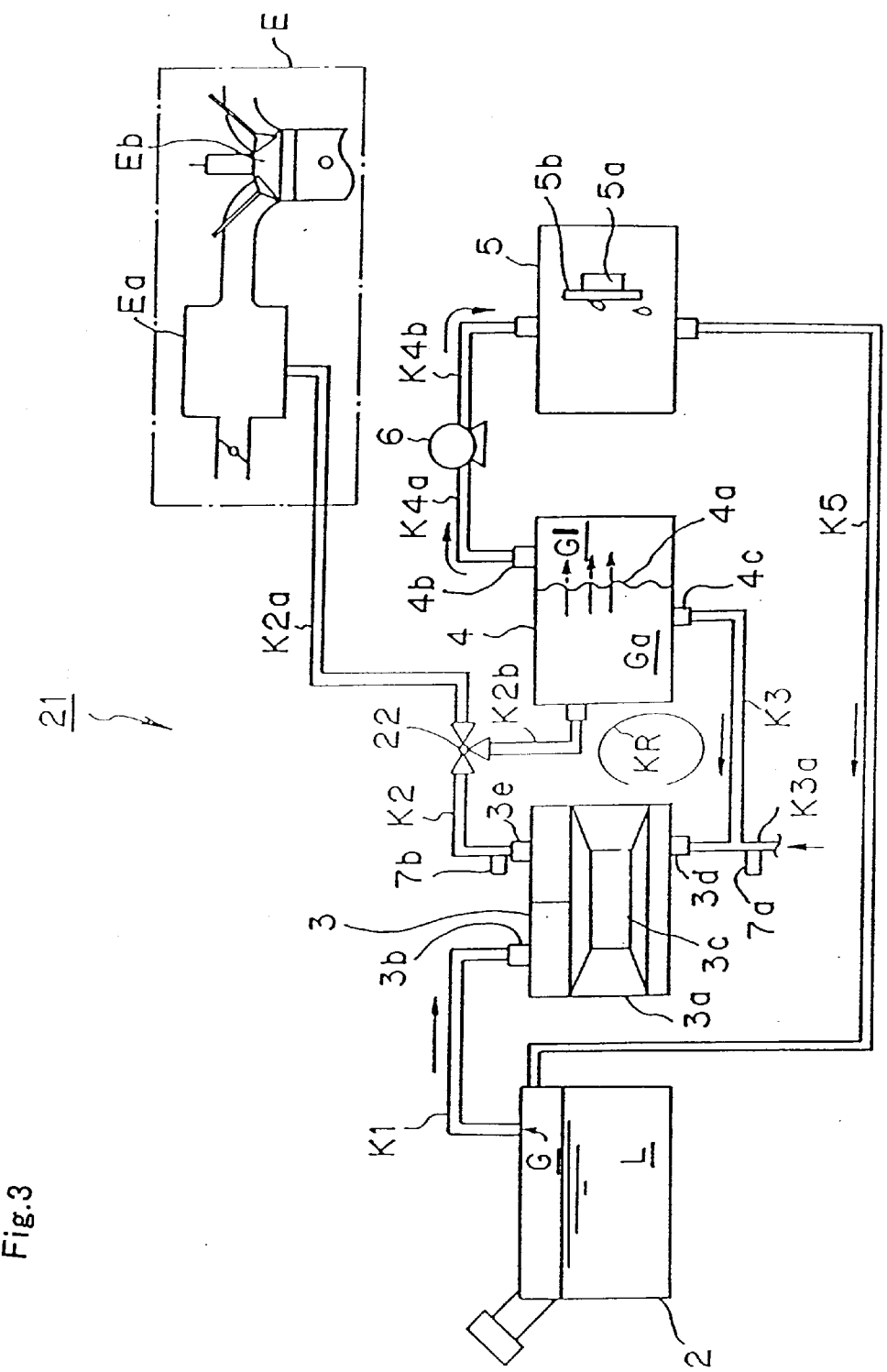
FIG. 3 is a descriptive diagram of the fuel vapor recovery apparatus according to a second embodiment.

FIG. 3 is a descriptive diagram of a fuel vapor recovery apparatus 21 according to a second embodiment. In the FIG. 3, the same reference is given to the same parts as described in FIG. 1 according to the first embodiment.

The fuel vapor recovery apparatus 21 is provided with a valve 22 (three way valve) in the midway of passage K2. The passage K2 is bifurcated into passage K2a and passage K2b, and it is possible to selectively let fuel vapor G flow into either of the passages.

Figure 10:
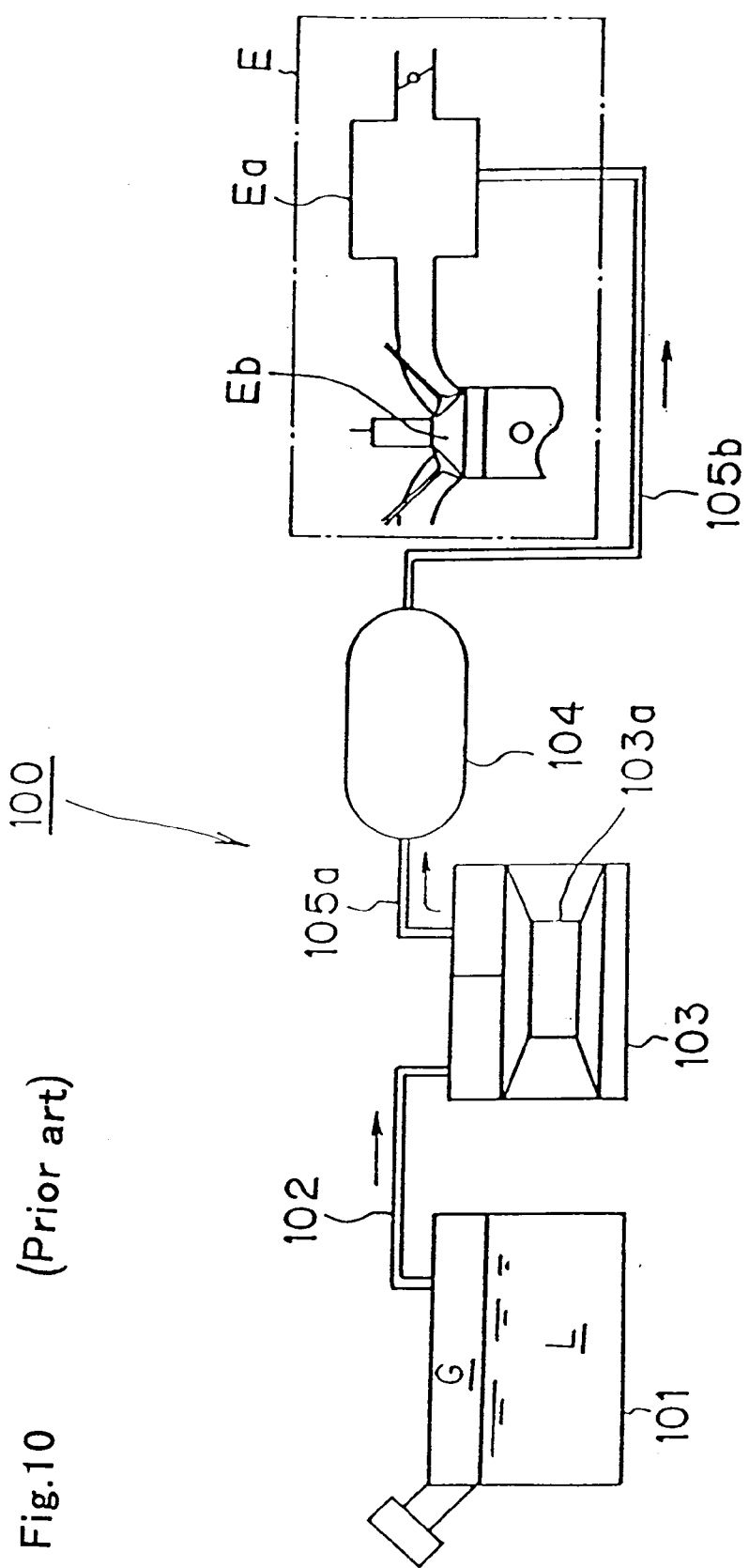
FIG. 10 is a constituent descriptive diagram of a fuel vapor recovery apparatus found in the prior art.

The passage K2a supplies the fuel vapor G scavenged from the canister 3 to an intake pipe Ea of the engine E, similar to a ventilation passage 105a of the fuel vapor recovery apparatus 100 found in the prior art, as shown in FIG. 10. Accordingly, the fuel vapor G flowing through this passage K2a is burned in a combustion chamber Eb of the engine E by the negative suction pressure of the intake pipe Ea sas in the prior art. For reference, it is also possible to dispose a control valve (not shown in the drawing) midway in the passage K2a and control an introducing amount to the intake pipe Ea.

As described in the first embodiment, the fuel rich mixture G1 permeating the separation membrane 4a is liquefied by the condensation means 5 and returned to the fuel tank and recovered. The air rich mixture Ga not permeating the separation membrane 4a is returned to the canister 3 from the gas rich exhaust port 4c through the passage K3 and is utilized again for scavenging the fuel vapor G absorbed in the activated charcoal 3c in the canister 3.

Figure 4:
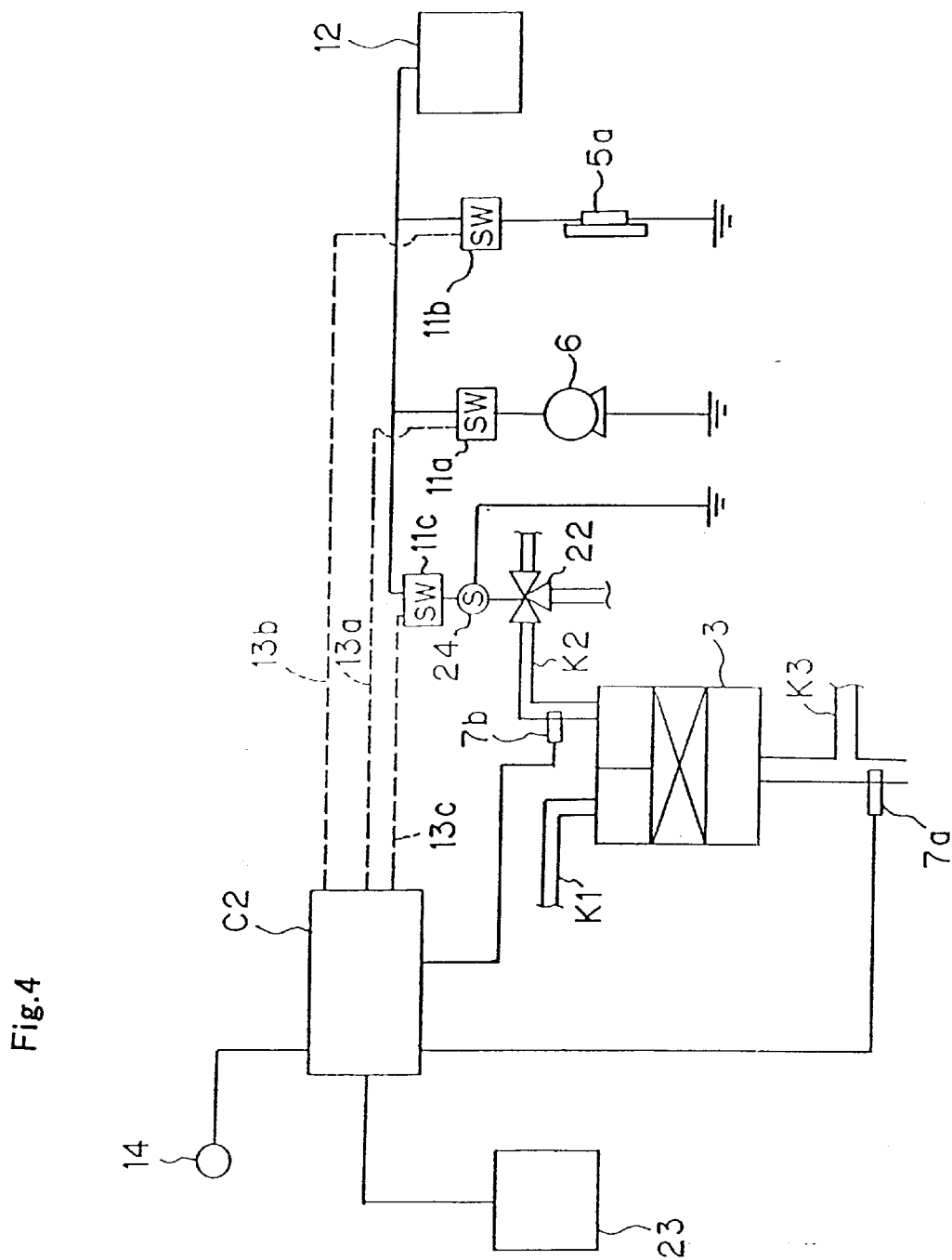
FIG. 4 is a circuit descriptive diagram of the control means of the fuel vapor recovery apparatus according to the second embodiment.

FIG. 4 is a circuit constituent diagram, showing a typical constitution of elements for the fuel vapor recovery apparatus 21 and connections with the control means C2. In FIG. 4, the same reference is given to the same parts as described in FIG. 2 and FIG. 3

Information about engine speed from an engine speed detecting device 23 as a driving condition detection means for detecting the driving condition of the engine E is input to the control means C2. An on-off control by the signal passage 13c and switch 11c is made for a solenoid 24 which controls an on-off switching valve 22.

According to this second embodiment, an operational control of the fuel vapor recovery apparatus 21 is made in addition to the operational control by the HC sensor 7a and 7b of the fuel vapor recovery apparatus 21 according to the storing quantity of the fuel vapor G in the canister 3.

As one example of the control, when an engine speed is lower than the specified speed (for example, 2000 RPM), the fuel vapor from the passage K2a is made not to be supplied to the intake pipe Ea by closing off the passage K2a. At the same time, the passage K2b is opened and liquidization of the fuel vapor G and recovery thereof into the fuel tank 2 is made by the membrane separation means 4 and the condensation means 5.

Further, when the engine speed is higher than the specified speed (for example, 2000 RPM), instead of liquidization of the fuel vapor G and recovery thereof into the fuel tank 2 by the membrane separation means 4 and the condensation means 5 by the closing off the passage K2b, the passage K2a is opened and the fuel vapor is supplied to the intake pipe Ea from the passage K2a and burned.

By performing the control as described above, if the supply of the fuel vapor from the passage K2a is more than the specified amount that does not cause a decrease in drivability of the engine E or a deterioration of the exhaust gases ingredient, the canister 3 can be quickly scavenged by aggressively burning fuel vapor G.

Also, the driving time of the pump 6 and the semiconductor device 5a can be shortened. This is very effective for reducing the amount of consumption electricity and exhaustion of the battery 12 that can lead to a dead battery.

For reference, a construction is possible wherein the fuel vapor recovery apparatus 21 is not provided with the canister 3 and the passage K2 is directly connected with the fuel tank 2. However, in this case, the fuel vapor G generated from the fuel tank 2 when the engine is turned off is recovered and processed by the membrane separation means 4 and the condensation means 5, and for this reason the exhaustion of the battery has to be taken into consideration.

In the above description, the valve 22 is made to selectively allow passage through either the passage K2a or passage K2b. However, the passage K2a always passes through the passage K2, and it is only when the membrane separation means 4 and the condensation means 5 are to be operated that it is also possible to use a construction wherein the passage K2b is passed through.

Embodiment 3

Figure 5:
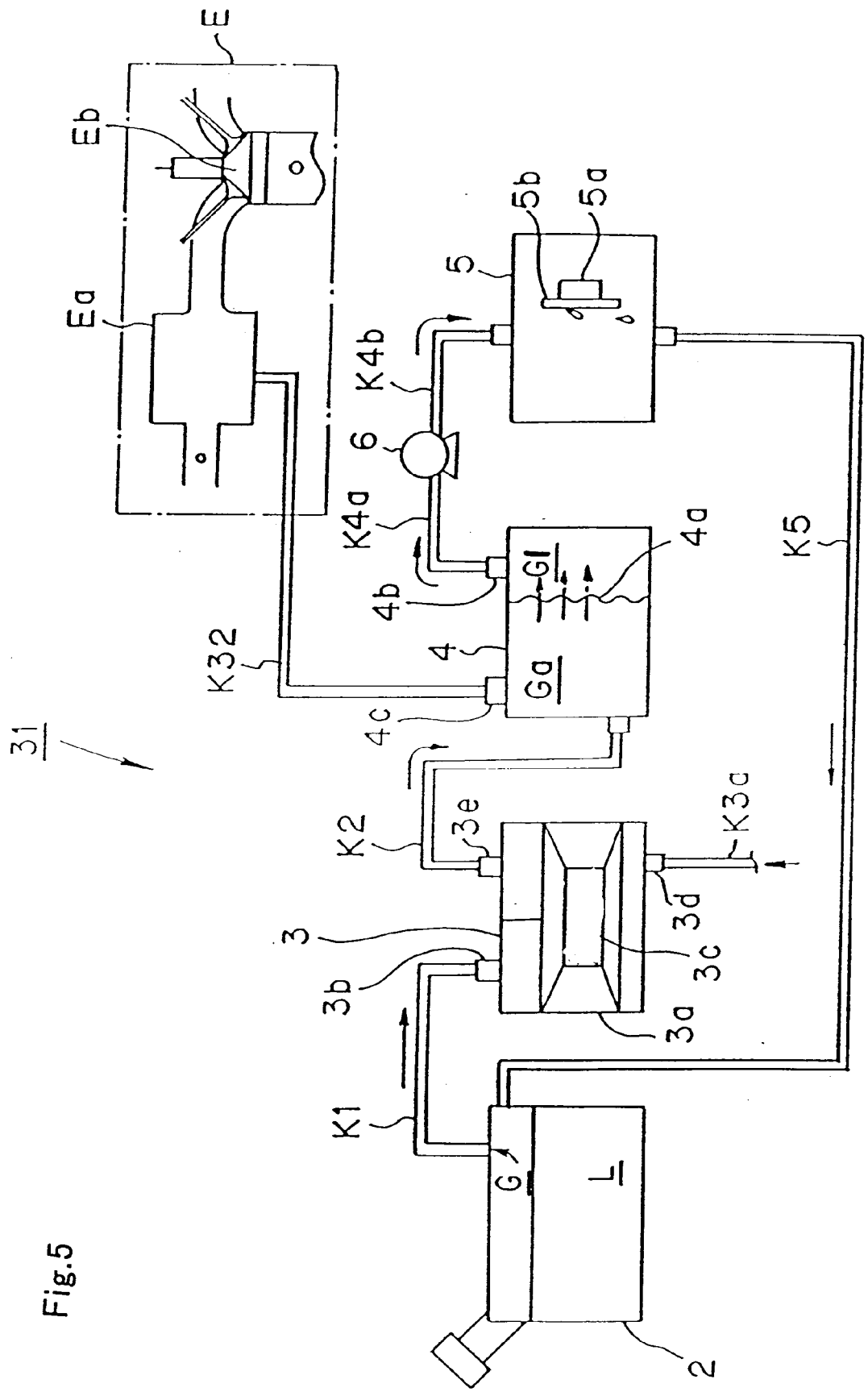
FIG. 5 is a descriptive diagram of the fuel vapor recovery apparatus according to a third embodiment.

FIG. 5 is a diagram, describing a fuel vapor recovery apparatus 31 according to a third embodiment. In FIG. 5, the same reference is given to the same parts as described in FIG. 1 according to the first embodiment.

In the fuel vapor recovery apparatus 31, the gas rich mixture exhaust port of the membrane separation means 4 and the intake pipe Ea are connected by a passage K32.

Also, in this embodiment, an HC sensor is not provided, and the pump 6 requiring a power supply and the condensation means 5 are always operated when the engine E is in operation.

Since the fuel vapor is separated by the membrane 4a into the fuel rich mixture G1 and the air rich mixture Ga, the vapor supplied from the passage K32 to the intake pipe Ea contains little fuel. Therefore there is only a small negative effect on the drivability of engine E and on the exhaust gases.

In the present invention as described above, the fuel vapor generated from the fuel tank can be liquefied and returned to the fuel tank and recovered. Accordingly, an effect given to the air-fuel mixture of the intake portion of the engine by the fuel vapor thus recovered is diminished or gone, thereby preventing a lowering of the drivability of the engine.

Also, at the time of a low driving speed of the engine, etc., even if the volume of the fuel vapor generated from the fuel tank is much more than the scavenging volume of the canister, the fuel vapor can be liquefied and recovered without being diffused into the atmosphere.

The fuel vapor recovery apparatus can be suitably operated in connection with the amount of the fuel vapor generated by including a detection means for detecting the amount of fuel vapor absorbed in the canister or a fuel vapor sensor, a fluid conveyance means, and a control means.

Also, by contacting a heat absorption member connected with the semiconductor device utilizing peltier effect with the fuel rich mixture that is separated by the membrane, the fuel rich mixture is liquefied by contact with the heat absorption member and becomes lower in temperature, and at the same time, it is possible to construct the condensation means as compact as possible, thereby improving the loadability of the apparatus to vehicles.

Also, the control means performs an adequate operational control of the fuel vapor recovery apparatus according to the driving conditions of the engine detected by a driving condition detection means and it is possible to reduce the amount of electricity consumption by intermittent driving of the fuel vapor recovery apparatus or by shortening the scavenging time of the canister.

Embodiment 4

Figure 6:
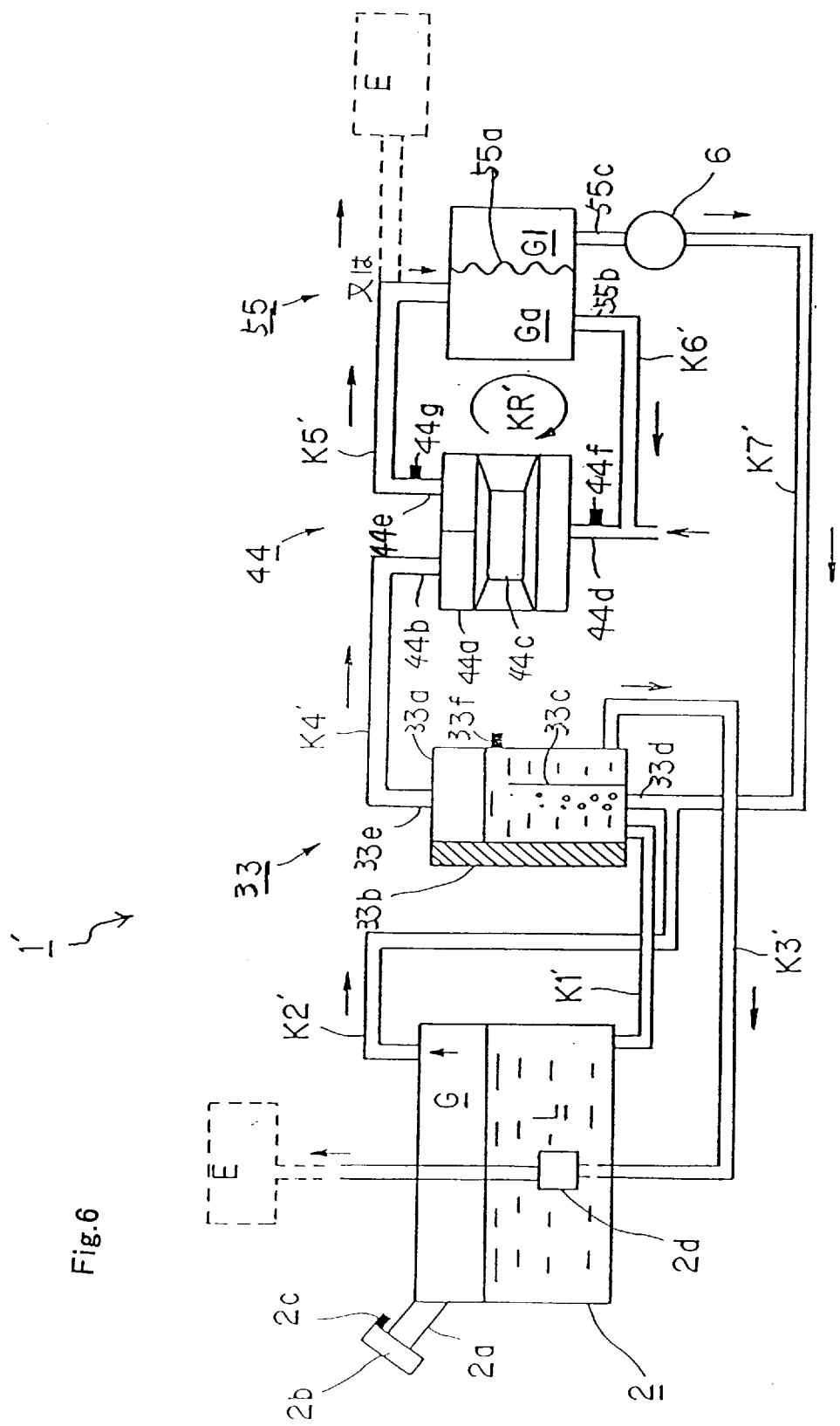
FIG. 6 is a descriptive diagram of the fuel vapor recovery apparatus according to a fourth embodiment.

The present invention will be described in details as follows on the basis of a fourth embodiment as shown in FIG. 6 The fuel vapor recovery apparatus 1' related to this fourth embodiment of the present invention is an apparatus which makes it possible for the fuel vapor G generated from the fuel tank 2 that is provided with automobiles, etc. with, for example, gasoline or light oil made as fuel L to be liquefied and returned again to the fuel tank 2. As shown in FIG. 6, its main construction includes a condenser 33, a canister 44, a membrane separation means 55, and pump 6.

First, the parts and the connections state among each of the parts will be described as follows.

The fuel tank 2 is provided with the fuel filler port 2a for supplying the fuel, and the fuel filler port 2a is usually closed by the fuel filler cap 2b. 2c is an oil filler cap sensor for detecting opening and shutting of the fuel filler cap 2b and inputs the detected information to the control means which will be described herein.

A suction portion 2d of the fuel supply pump as a fuel supply portion for supplying the fuel to a fuel injection device (not shown in the drawing) of the engine E is disposed to the bottom inside of the fuel tank 2.

The condensation means 33 is connected with the fuel tank 2 through connecting passage K1' and includes a cooling vessel 33a as a container for storing fuel L introduced from the fuel tank 2, a heat absorbing device 33b having in the inside a semiconductor device (semiconductor thermoelectric conversion member) utilizing peltier effect and functioning as a cooling means for cooling and keeping the fuel cool in the cooling vessel 33a and the condensation means, and a diaphragm 33c for dividing the cooling vessel 33a.

The condensation means 33 further includes the inflow port 33d for connecting the fuel vapor G from the fuel tank 2 on the side of the heat absorbing device 33b of the cooling vessel 33a to the passage K2', the fuel return passage K3' for returning the fuel liquefied and absorbed by the condensation means 33 to the fuel tank 2, and an exhaust port 33e for exhausting the fuel vapor G not liquefied.

Also, the condensation means 33 is provided with a temperature sensor 33f for detecting the temperature of fuel L inside of the container 33a, and sensor 33f inputs the detected information to the control means C1 to be described forthwith.

For reference, the construction of the condenser 33 can also be adapted to include a semiconductor device utilizing in the inside a peltier effect and a heat absorption fin as a heat absorption member connected with the semiconductor device, wherein the fuel vapor G is cooled, condensed and made into liquid fuel L (gasoline or light oil) by contact with the heat absorption fin.

The canister 44 includes an inflow port 44b connected with a passage K4' for introducing the fuel vapor G from the condenser 33, activated charcoal 44c as an absorption means for absorbing the fuel vapor G flowed therein, a gas or air introduction port 44d for introducing gas (typically air, but it is also possible to use inert gas) to scavenge the fuel vapor G absorbed in the activated charcoal 44c and an exhaust port 44e for exhausting the fuel vapor G scavenged inside of the container 44a.

HC sensor 44f and 44g for detecting HC (hydrocarbon) contained in the fuel vapor G as a fuel vapor sensor are disposed close to the gas introduction port 44d and the exhaust port 44e, respectively, of the canister 4.

A membrane separation means 55 separates the fuel vapor G from the exhaust port 44a of the canister 44 passing through the passage K5', by a separation membrane 55a, into an air rich mixture Ga (the air wherein the fuel vapor G is reduced and scarcely contained) and a fuel rich mixture G1 (high concentration fuel vapor being low in air content). Each of the mixture can be emitted from the air rich exhaust port 55b and a fuel rich mixture exhaust port 55c, respectively.

The air rich exhaust port 55b of the membrane separation means 55 and the gas or air introduction port 44d of the canister 44 are connected by a passage K6' and air rich mixture Ga is made to return to the canister 44. Accordingly, scavenging circulatory passage KR' is formed, which starts from canister 44 and enters the membrane separation means 55 through the passage K5' and then starts from the air rich exhaust port 55b and returns to the canister 44 through the passage K6'

The fuel rich exhaust port 55c is connected with a fuel vapor return passage K7' connected with the inflow port 33d of the condenser 33 and supplies the fuel rich mixture G1 separated by a pump 6 as a fluid conveyance means to condenser 33.

The operation of the fuel vapor recovery apparatus 1' as constructed above will be described as follows. As a result of phenomena such as an increase in temperature of fuel L in the fuel tank 2 or the like, fuel vapor G generated in the fuel tank 2 enters into condenser 33 through passage K2'.

The container 33a of the condenser 33 is filled with fuel L from the fuel tank 2 through the passage K1' and the fuel L is cooled and kept cool by the heat absorbing device 33b. The fuel vapor G is run through the cooled fuel L and liquefied and absorbed and then run through the passage K3' and introduced close to suction portion 2b of a fuel supply pump inside of the fuel tank 2 and preferably supplied to the engine and consumed.

If the method of letting the fuel vapor G pass through the cooled fuel is used, liquidization efficiency increases by about 1.5 times compared to a method wherein the condenser is only provided with a cooling fin and the fuel vapor G is then directly cooled, condensed, and liquefied.

Figure 7:
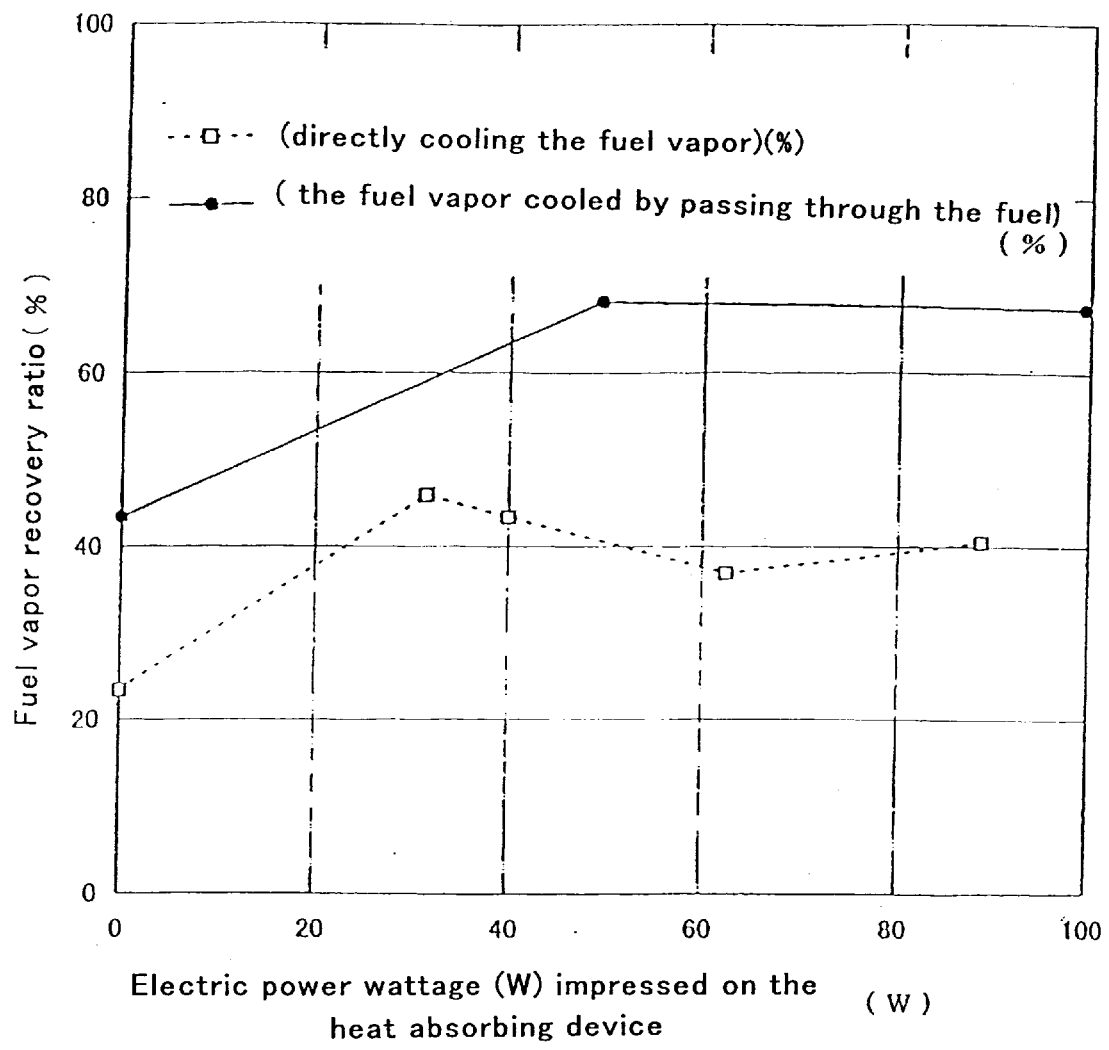
FIG. 7 is a graphic chart showing the result of comparison experiments of the recovery ratio of the fuel vapor.

FIG. 7 is a graphic chart, showing a result of an experiment comparing a recovery percentage of the fuel vapor of the condenser 33 according to the fourth embodiment with that of the condenser of the mode wherein the fuel vapor is directly cooled by a cooling fin, etc. and condensed and liquefied This graph treats the axis of ordinates as the recovery percentage (%) of the fuel vapor and the axis of abscissas as an electric power wattage (W) impressed on the heat absorbing device. The recovery percentage of the fuel vapor corresponding to each electric power wattage (W) is found out by introducing a fuel vapor having the same fluid amount per unit hour to both of the condenser modes.

According to the experimental results, the recovery percentage of the fuel vapor is from about 23% to a maximum 45% in the case of the condenser of a cooling fin only mode.

In the case of the condenser according to the fourth embodiment, the recovery percentage of the fuel vapor is from about 43% to a maximum 67%, and the recovery percentage of the fuel vapor is thus confirmed to be improved.

For reference, in the condenser 33 according to this forth embodiment, about 70% of the fuel vapor G (at the time the generating volume of the fuel vapor is at its maximum) generated from the fuel tank 2 is fixed as an amount possible to be liquefied and the fuel vapor G of about 30% not liquefied here is introduced to and absorbed by the canister 44 through the passage K4'.

Accordingly, it is not that the fuel vapor G generated from the fuel tank 2 is directly introduced to the canister 44 but rather that the portion not condensed and liquefied (about 30% at the time of the maximum volume generated) when passing through the condenser 33 is alone introduced. For this reason, the volume of the canister 44 can be fixed at about one third compared to that required in the method of directly introducing the fuel vapor G generated from the fuel tank 2. Furthermore, when the fuel vapor G is introduced to canister 44 and exceeds an absorbing amount of the canister 44, the fuel vapor G overflows into an air introduction port 44d of the lower portion of the canister 44, which is sensed by the hydrocarbon sensor 44f disposed close to gas introduction port 44d, thereby activating pump 6.

When the pump 6 is activated, an air is suctioned from the air introduction port 44d of the lower portion of the canister 44 and enters membrane separation means 5 through the passage K5' while scavenging fuel vapor G absorbed in activated charcoal 44c in the canister 44.

The air rich mixture Ga and fuel rich mixture G1 are separated, and the air rich mixture Ga which does not permeate a membrane enters inside of the canister 44 from the air rich mixture exhaust port 55b through the passage K6' and, after that, enters the membrane separation means 55 again through the passage K5' (scavenging circulatory passage KR')

On the other hand, the fuel rich mixture G1 permeating the membrane enters condensation means 33 through the passage K6' and is liquefied again.

When the above cycle is repeated continuously until the fuel vapor G absorbed in the activated charcoal 44c in the canister 44 is reduced and the fuel concentration of the fuel vapor G is reduced, a hydrocarbon sensor 44g disposed in the passage K5' proximate to an exhaust port 44e detects the reduced concentration and terminates the operation of the pump 6.

For reference, the condenser 33 may be allowed to operate so as to keep it at the necessary temperature after the engine is activated.

Also, in order not to discharge the fuel vapor G into the atmosphere when the fuel is being supplied to the fuel tank 2, the condenser 33 can be activated by the fuel filler cap sensor 2c that senses opening and closing of the fuel filler cap 2b disposed on fuel filler port 2a of the fuel tank 2 even during the time the engine is not running.

As described above, the generated fuel vapor G can be recovered without considerations of the driving conditions of the automobile (on-off of the engine) or the outside environments (atmosphere temperature or the like) while allowing to make the canister as compact as possible.

Also, the activation of the apparatus is automatically performed by sensors of various types and by the control means according to the relative generation of the fuel vapor G from the fuel tank 2 or to the operating state of the apparatus and it is possible to completely prevent only discharging of the fuel vapor G into the atmosphere.

For reference, since the amount of the fuel vapor G introduced to the canister 44 is reduced to about half of the amount of conventional methods, it is also possible to omit the membrane separation means 55, the pump 6, or the like in the case where there is no harmful effect caused when the fuel vapor G is allowed to flow to the intake portion of the engine via the passage K5' through use of a control valve or the like, if necessary therein.

It is also possible that, in each of the passages, a check valve or the like is suitably disposed at a midpoint of the passage in the case where the flowing direction of the fluid, such as the fuel vapor G, etc., is made in a fixed direction.

Figure 8:
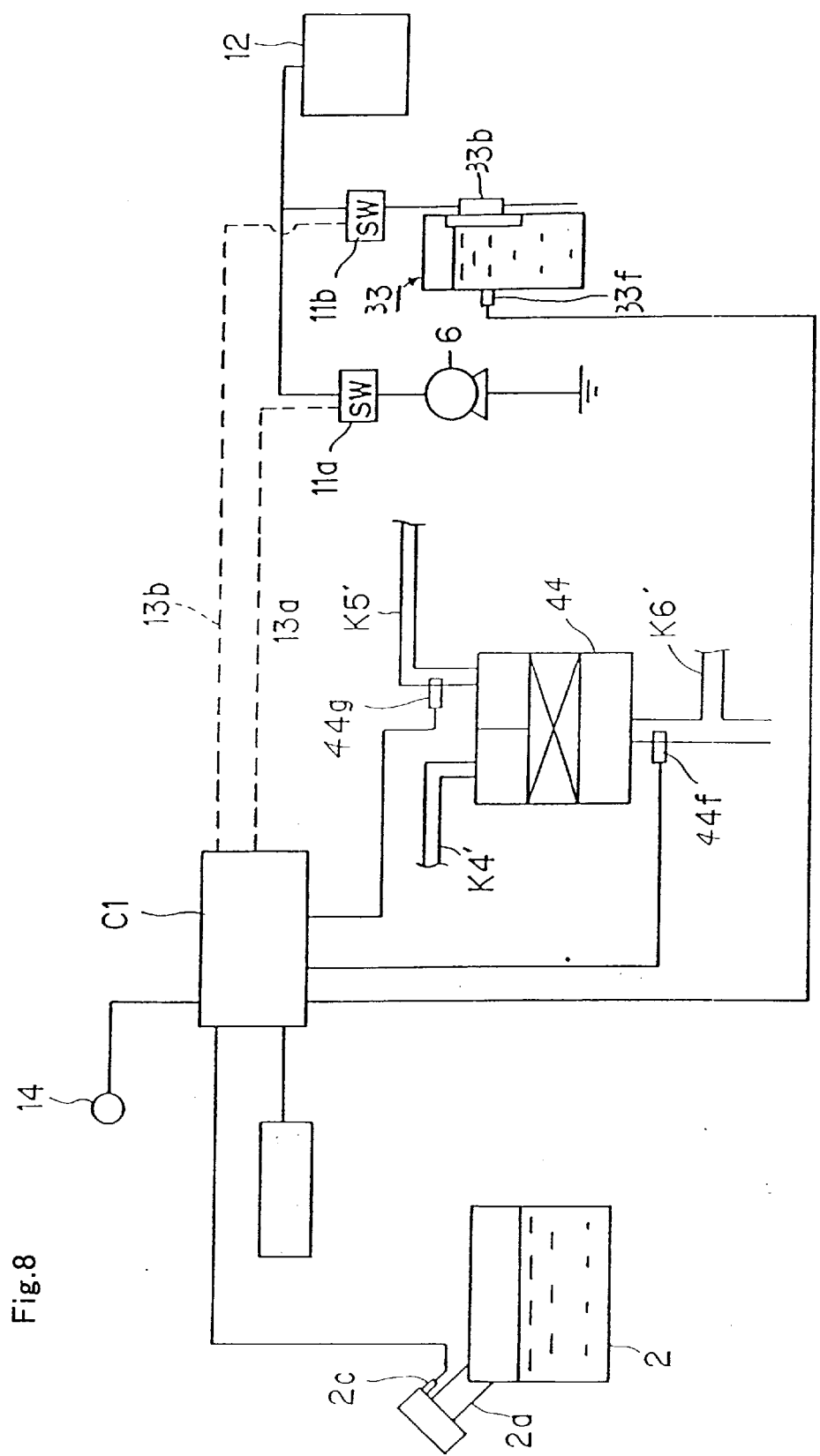
FIG. 8 is a circuit descriptive diagram of the control means of the fuel vapor recovery apparatus according to the fourth embodiment.

FIG. 8 is a circuit constituent diagram, showing typical connections of the elements of the fuel vapor recovery apparatus 1' and control means C1. In FIG. 8, the same reference numerals is given to the same parts as described in FIG. 6. 11a and 11b are switches for supplying electric current from the battery 12 to the pump 6 and the semiconductor device in the condenser 33 and are controlled for activation by signal passages 13a and 13b, respectively, from the control means C1. 14 is an alarm lamp which turns on when anything abnormal happens to the fuel vapor recovery apparatus 1.

For reference, it is alright if the control means C1 adapts either a construction made from an electric circuit or a construction including a CPU or a memory wherein the information input is processed by software. It is also possible for the control means to adapt a construction built into an engine control device attached to the engine body.

In the condenser 33, on the basis of an activating signal input to control means C1 and a signal of a temperature sensor 33f disposed in the condenser 33, the control means C1 determines and activates or stops switch 11b, thereby keeping the condenser 33 at the necessary temperature.

Also, even during the time the engine is off, the switch 11b can be controlled independently for activation through the control means C1 by a signal from the fuel filler cap sensor 2c disposed on the fuel filler port 2a of the fuel tank 2.

The control of the operation of pump 6 is made as follows. Concentration of the fuel vapor G entering into the canister 44 from condenser 33 and overflowed is sensed by the HC sensor 44f and the signal thereof is sent to the control means C1. The control means C1 activates the switch 11a of the pump 6 by determining the fuel concentration input, and the pump 6 starts the operation.

When concentration of the fuel vapor from the canister 44 becomes low, the HC sensor 44g detects the concentration and sends a signal to the control means C1. Control means C1 determines fuel concentration input and activates the switch 11a of the pump 6, and the pump 6 stops.

Accordingly, the control means C1 performs an adequate operating control of the fuel vapor recovery apparatus according to conditions of each detection, and it is possible to reduce the amount of electricity consumption by intermittent operation of the fuel recovery apparatus, or to improve the condensing efficiency by keeping temperature of fuel L in the condenser 33 at an adequate temperature, or to shorten the scavenging time of the canister.

For reference, when anything abnormal happens to each of the sensors and units, the alarm lamp 14 installed on a driver's compartment can be turned on as a sign of the abnormality of the apparatus. A means to measure the time from the start of the operation of the fuel vapor recovery apparatus to the end of the operation can be disposed in the control means C1 so that if the operation of the fuel vapor recovery apparatus 1' does not stop in a specified time from the beginning of the operation of the apparatus, the means to measure the time will determine that there is something abnormality in the apparatus and the alarm lamp 14 installed in the driver's compartment can also be turned on.

Furthermore, instead of using the HC sensor as a detection means for detecting the amount of fuel vapor absorbed in the canister 44, it is possible for the apparatus to include a loading weight sensor for detecting the weight of the fuel vapor G stored in the activated charcoal 44c or a resistance sensor for measuring a change in electric conductivity of the activated charcoal 44c and thereby detecting the amount of the fuel vapor G stored, and it is thus possible that the operation of the pump 6 can be controlled by these sensors.

In this case, for example, it is also possible to start the operation of the pump 6 when the maximum storing amount of the fuel vapor G by the activated charcoal 44c reaches about 70% and to stop the operation of the pump 6 when the maximum storing volume of the fuel vapor G is reduced to 20%

Figure 9:
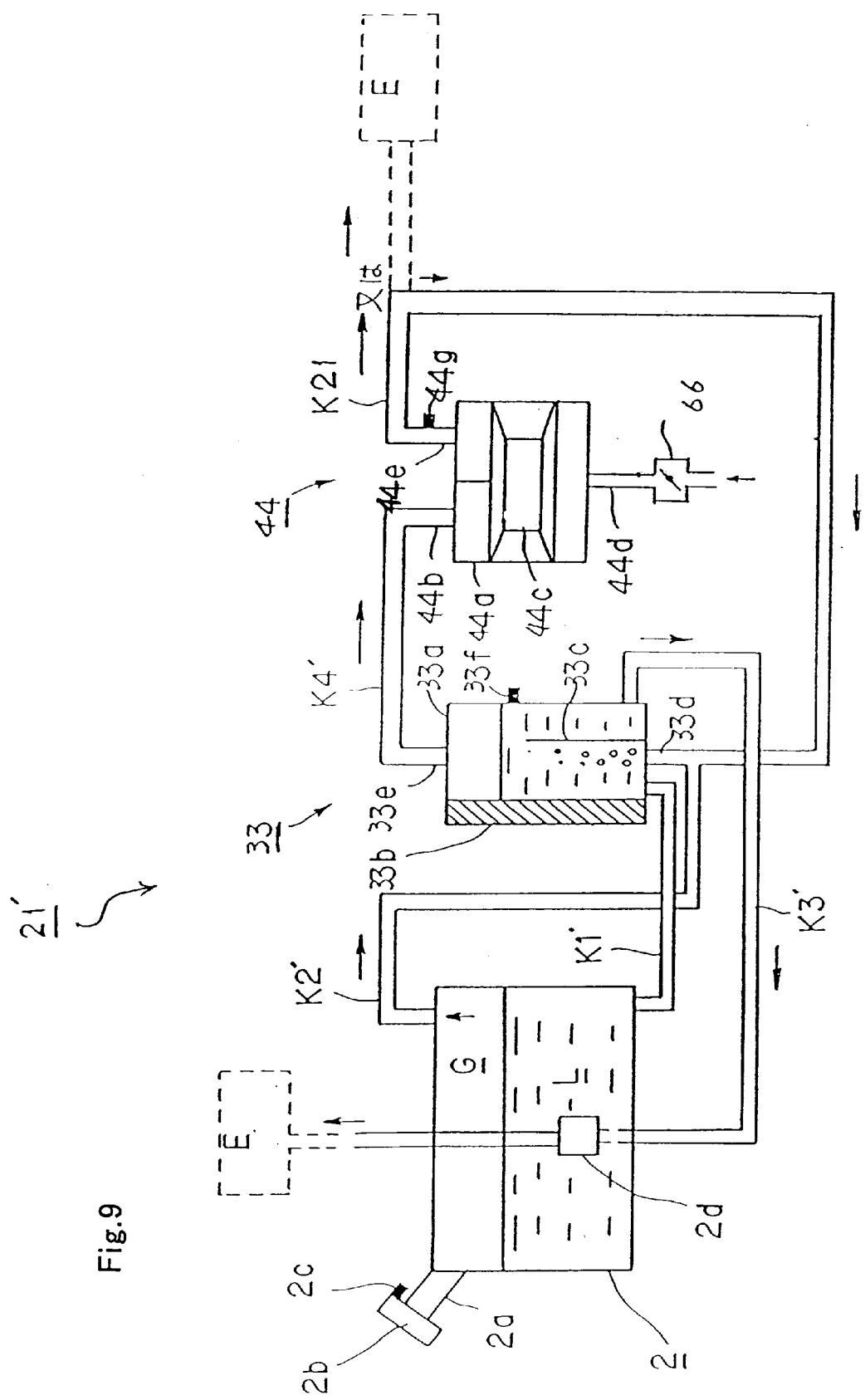
FIG. 9 is a descriptive diagram of the fuel vapor recovery apparatus according to a fifth embodiment.

FIG. 9 is a descriptive diagram of the fuel vapor recovery apparatus 21, describing the fifth embodiment. The same reference numerals are given to the same parts with the fuel vapor recovery apparatus according to the fourth embodiment.

As described in the fourth embodiment, since about 70 (%) of the fuel vapor G generated from the fuel tank 2 is liquefied and recovered by the condenser 33, a quantity of flow of fuel vapor G flowing toward the canister 44 is decreased and, in the case where the canister has enough capacity, no membrane separation is specially required.

Accordingly, the fuel vapor recovery apparatus 21 is not provided with the membrane separation means and the exhaust port 44g of the canister 44 is connected to the inflow port 33d of the condenser 33 via the passage K21.

Also, the gas or air introduction port 44d of the canister 44 is provided with a control valve 66 (if it is a total flow amount control means, it is possible to adapt another construction) for controlling the amount of gas or air entering the gas introduction port.

The operation of the fuel vapor recovery apparatus 21' is to detect the concentration of the fuel vapor scavenged from the canister 44 by a HC sensor 44g and to control the gas or air entering the canister 44 by adjusting an opening of the control valve 66 by a control device.

Also, in the case where it is permissible that the fuel vapor scavenged from the canister 44 can be introduced to an intake apparatus and burned by the engine E. it is possible that the passage K21 is bifurcated and connected to the engine E as shown by dotted lines in FIG. 9.

Other construction and operations and the effects thereof are the same with the fourth embodiment, and therefore the description thereof will be omitted.

In the present invention as described above, the fuel vapor generated from the fuel tank can be liquefied, returned to the fuel tank and recovered. Accordingly, the problems caused by supplying the fuel vapor to the intake portion of the engine can be reduced or eliminated, thereby preventing problems with derivability of the engine.

Also, at the time of low speed driving, or the like, even when the volume of the fuel vapor generated from the fuel tank is large, the fuel vapor is not discharged into the atmosphere, but rather can be liquefied and recovered.

Also, a portion of the fuel vapor introduced into the condenser means is condensed in the condenser means, so the amount of the fuel vapor introduced to the canister is remained which is not condensed in the condenser means. Hence, the canister can be made as compact as possible.

Condensing efficiency of the fuel vapor can be improved by having the fuel vapor liquefied and absorbed in the fuel that is cooled and kept cool in the condenser container.

Also, by providing various sensors and control means, the operation of the fuel vapor recovery apparatus can be automatically controlled.

In the case where the apparatus is provided with fuel filler sensor detecting opening and closing of fuel filler cap, escaping of the fuel vapor at the time of supplying the fuel can be reduced.

By connecting the fuel return passage returning the fuel liquefied by the condensation means to the fuel tank proximate to a fuel supply portion for supplying the fuel to the engine in the fuel tank, the fuel liquefied by the condensation means is consumed by the engine as quickly as possible and generation thereafter of the fuel vapor can be reduced.

In the case where the amount of the fuel vapor flowing into the canister is small, it is possible that the apparatus can supply the fuel vapor scavenged from inside of the canister directly to the condenser or the intake portion of the engine without being provided with the membrane separation means, thereby making the construction of the apparatus more simple and less complicated.

What is claimed is:

1. A fuel vapor recovery apparatus comprising:
   a canister including an inflow port for introducing fuel vapor from a fuel tank, an absorption means for absorbing the fuel vapor in said canister, a gas introduction port for introducing gas to scavenge the fuel vapor absorbed by said absorption means, and an exhaust port for exhausting the scavenged fuel vapor;
   a membrane separation means for separating by a separation membrane the fuel vapor flowing from the exhaust port of said canister into a fuel rich mixture and an air rich mixture and exhausting each of the ingredients from a fuel rich mixture exhaust port and a gas rich mixture exhaust port;
   a scavenging circulatory passage formed by connecting the gas rich mixture exhaust port of said membrane separation means and the gas introduction port of said canister;
   a condensation means for liquefying the fuel rich mixture introduced from the fuel rich mixture exhaust port of said membrane separation means and separated by the membrane;
   and a return passage for returning the liquefied fuel liquefied by said condensation means to the fuel tank.

2. A fuel vapor recovery apparatus comprising a canister including an absorption means for temporarily storing fuel vapor from a fuel tank and a supply passage for supplying the fuel vapor that is scavenged from an inside of said canister to an intake portion of an engine;
   a membrane separation means being disposed at a midpoint of said supply passage for separating by a separation membrane the supplied fuel vapor into a fuel rich mixture which is exhausted from an fuel rich mixture exhaust port and an air rich mixture which is exhausted downstream of said supply passage;
   a condensation means for liquefying the fuel rich mixture introduced from the fuel rich mixture exhaust port of said membrane separation means and separated by the membrane; and
   a return passage for returning the fuel liquefied by said condensation means to the fuel tank.

3. A fuel vapor recovery apparatus comprising, a canister being provided with an inflow port for introducing fuel vapor from a fuel tank, an absorption means for absorbing the fuel vapor in said canister, a gas introduction port for scavenging the fuel vapor absorbed by the absorption means, an exhaust port for exhausting the scavenged fuel vapor, and a supply passage for supplying the fuel vapor scavenged from the exhaust port of said canister to an intake portion of an engine;
   a membrane separation means being connected at a midpoint of said supply passage for separating by a separation membrane the fuel vapor supplied into a fuel rich mixture which is exhausted from a fuel rich mixture exhaust port and an air rich mixture which is exhausted from a gas rich mixture exhaust port;
   a scavenging circulatory passage formed by connecting the gas rich mixture exhaust port of said membrane separation means and the gas introduction port of said canister;
   a condensation means for liquefying the fuel rich mixture introduced from the fuel rich mixture exhaust port of said membrane separation means and separated by the membrane;
   and a return passage for returning the fuel liquefied by said condensation means to the fuel tank.

4. The fuel vapor recovery apparatus as claimed claim 1, further comprising:
   a detection means for detecting a volume of fuel vapor absorbed in said canister;
   a fluid conveyance means with which a passage is provided downstream of said membrane separation means; and
   a control means for controlling operation of said fluid conveyance means and said condensation means.

5. The fuel vapor recovery apparatus as claimed in claim 1, further comprising:
   a fuel vapor sensors provided with the gas introduction port and the exhaust port of said canister;
   a fluid conveyance means with which a passage is provide downstream of said membrane separation means; and
   a control means for controlling operation of said fluid conveyance means and said condensation means according to detected conditions of said fuel vapor sensors.

6. The fuel vapor recovery apparatus as claimed in claim 5, further comprising a heat absorption member connected to a semiconductor device utilizing peltier effect and contacting to said fuel rich mixture separated by the membrane.

7. The fuel vapor recovery apparatus as claimed in claim 4, further comprising a driving condition detection means for detecting driving conditions of an engine, wherein said control means controls the driving of said fluid conveyance means and said condensation means according to driving conditions of the engine detected by the driving condition detection means.

8. A fuel vapor recovery apparatus comprising;
   a condensation apparatus comprising an inflow port for introducing fuel vapor from a fuel tank, a condensation means for liquifying fuel vapor in said condensation apparatus, a return pass for returning fuel liquefied by said condensation means to the fuel tank, and an exhaust port for exhausting the fuel vapor not liquefied by said condensation means;

a canister including an inflow port for introducing the fuel vapor not liquefied by said condensation apparatus, an absorption means for absorbing the fuel vapor in said canister, a gas introduction port for introducing gas which scavenges the fuel vapor absorbed by the absorption means, and an exhaust port for exhausting the scavenged fuel vapor, and a passage formed by a connection from the exhaust port of said canister to the inflow port for introducing the fuel vapor of said condensation apparatus and said connection can be switched from the latter to an inflow port for the fuel vapor flow into an engine.

9. The fuel vapor recovery apparatus as claimed in claim 8, further comprising:

a membrane separation means for separating by a separation membrane the fuel vapor flowing from the exhaust port of said canister into an air rich mixture and a fuel rich mixture and exhausting each of the mixtures from an air rich mixture exhaust port and a fuel rich mixture exhaust port, respectively;

a scavenging circulatory passage formed by connecting the air rich mixture exhaust port of said membrane separation means and the gas introduction port of said canister; and a fuel vapor return passage connecting the fuel vapor rich mixture exhaust port of said membrane separation means and the inflow port for introducing the fuel vapor of said condensation apparatus.

10. The fuel vapor recovery apparatus as claimed in claim 8, wherein said condensation apparatus further includes a container for storing fuel introduced from the fuel tank and a cooling means for cooling and keeping cool the fuel in the container, and the fuel vapor flowing from said inflow port is liquefied and absorbed into the fuel cooled in the container.

11. The fuel vapor recovery apparatus as claimed in claim 10, further comprising:

a fuel vapor sensor provided on the exhaust port of said canister, a control valve for controlling volume of the gas introduced to the gas introduction port of said canister;

a temperature sensor for detecting temperature of the fuel in the container of said condensation apparatus; and a control means for controlling said control valve and said condensation means according to detected conditions of said fuel vapor sensor and said temperature sensor.

12. The fuel vapor recovery apparatus as claimed in claim 9, further comprising:

a fuel vapor sensor provided on each of the gas introduction port and the exhaust port of said canister, a temperature sensor for detecting temperature of the fuel in the container of said condensation apparatus, a fluid conveyance means provided on said fuel vapor return passage, and a control means for controlling said fluid conveyance means and said condensation means according to detected conditions of said fuel vapor sensors and said temperature sensor.

13. The fuel vapor recovery apparatus as claimed in claim 11, further comprising fuel filler cap sensor for detecting opening and closing of the fuel filler cap in a fuel filler port of the fuel tank, wherein said control means controls operation of the cooling means according to detected conditions of the fuel cap sensor.

14. The fuel vapor recovery apparatus as claimed claim 9, wherein said fuel return passage for returning the liquefied fuel by the condensation means to the fuel tank is connected proximate to a fuel supply portion for supplying the fuel in the fuel tank to an engine.

* * * * *